United States Patent [19]

Nelson et al.

[11] Patent Number: 5,091,716
[45] Date of Patent: Feb. 25, 1992

[54] LIQUID LINE LEAK DETECTION METHOD AND APPARATUS

[75] Inventors: Thomas E. Nelson, Durham; Walter S. Brock, Cary, both of N.C.

[73] Assignee: EMCO Electronics, Cary, N.C.

[21] Appl. No.: 550,695

[22] Filed: Jul. 10, 1990

[51] Int. Cl.$^5$ .......................................... G08B 21/00
[52] U.S. Cl. .................... 340/605; 200/82 E; 73/49.1
[58] Field of Search ......... 200/82 E; 73/49.1, 49.2 R, 73/49.2 T, 744, 861.71; 340/605, 606

[56] References Cited

U.S. PATENT DOCUMENTS

| 3,928,848 | 12/1975 | Banville | 340/611 |
|---|---|---|---|
| 4,058,802 | 11/1977 | Meyers | 340/605 |
| 4,088,985 | 5/1978 | Saito et al. | 340/605 |
| 4,088,987 | 5/1978 | Resier et al. | 340/605 |
| 4,090,193 | 5/1978 | Hinkle | 340/605 |
| 4,300,388 | 11/1981 | Hansel et al. | 73/49.2 T |
| 4,410,883 | 10/1983 | Swiston, Sr. | 340/310 R |
| 4,518,955 | 5/1985 | Meyer | 340/605 |
| 4,586,033 | 4/1986 | Andrejasich | 340/603 |
| 4,644,354 | 2/1987 | Kidd | 340/605 |
| 4,646,069 | 2/1987 | Andrejasich et al. | 73/40.5 |
| 4,712,648 | 12/1987 | Mattes et al. | 73/744 |
| 4,721,950 | 1/1988 | Andrejasich et al. | 340/603 |
| 4,736,193 | 4/1988 | Slocum et al. | 340/603 |
| 4,740,777 | 4/1988 | Slocum et al. | 340/603 |
| 4,876,530 | 10/1989 | Hill et al. | 340/605 |
| 4,937,558 | 6/1990 | Robinet et al. | 340/611 |

*Primary Examiner*—Jin F. Ng
*Assistant Examiner*—Jill Jackson
*Attorney, Agent, or Firm*—Bell, Seltzer, Park & Gibson

[57] ABSTRACT

A method and apparatus for detecting leakage in a liquid transporting line using a line leak detector connected to the liquid line within a manway containing a pumphead of a submersible pump. The line leak detector contains a piston moving within a cylinder to detect changes in the liquid volume to determine a leak. The movement of the piston is converted to an electrical signal by a core, affixed to the piston, moving within a coil. Retrofit installation of the line leak detector in a fuel service station is facilitated by the use of the existing electrical power wiring between the pumphead and remote pump controller.

37 Claims, 4 Drawing Sheets

LIQUID LINE LEAK DETECTION METHOD AND APPARATUS

FIELD OF THE INVENTION

This invention relates to liquid delivery systems and more particularly to a method and apparatus for detecting leakage in the liquid transporting lines of liquid delivery systems.

BACKGROUND OF THE INVENTION

Liquid delivery systems are widely used for dispensing fuels (such as gasoline and diesel fuel) and other liquids. As is well known to those having skill in the art, a liquid delivery system, such as a fuel delivery system, typically includes a submersible pump for pumping a liquid from a storage tank, through a liquid line, and to a dispenser. The submersible pump typically includes a pumphead located in a covered manway atop the storage tank, a pump turbine submersed in the liquid in the storage tank, and a tube connecting the pumphead to the pump turbine. The liquid line to the dispenser is typically connected to the pumphead in the covered manway.

An electrical power line is connected to the pumphead in the covered manway and extends from the pumphead to a submersible pump controller located outside of the covered manway. The submersible pump controller selectively supplies electrical power through the power line to thereby activate the submersible pump when dispensing of liquid is desired or at other predetermined times.

Often, the liquid being delivered in a liquid delivery system is toxic, highly volatile, flammable, or otherwise hazardous. Accordingly, it is both desirable and necessary to provide a leak detector for the liquid delivery system so that maintenance activities can be promptly instituted to correct any leaks. In fact, for fuel delivery systems, federal, state, and local environmental protection regulations often mandate leak detection systems. Some leak detection systems are adapted to detect a leak in the liquid storage tank. Other leak detection systems are adapted to detect leaks in the liquid line from the pumphead to the liquid dispenser.

The two primary concerns in the design of a line leak detection system are ease of installation of the system components and accuracy of leak detection. Ease of installation is important because the covered manway atop the storage tank is typically remote from the submersible pump controller. A thick concrete or asphalt slab is provided to isolate the underground storage tank from above ground activity and to provide a surface for vehicles. A dispenser, for example a gasoline pump, is typically mounted on the concrete slab above ground with the liquid line running underground from the pumphead in the covered manway to the liquid dispenser on the concrete slab. Also, the submersible pump controller is typically mounted in a gasoline service station building, separate from the gasoline dispenser, and is electrically connected to the pumphead via an electrical power line which runs under, or in a conduit through, the concrete slab. Accordingly, the design of a liquid leak detector should minimize the need to disrupt the concrete slab in order to install the liquid line leak detector.

Accuracy of line leak detection is also an important consideration in a line leak detector system. Accuracy is important because small leaks must be detected in order to shut down the submersible pump before an environmentally hazardous leak occurs. Repeated false leak alarms, caused by an inaccurate leak detection system, may cause an operator to ignore or bypass a true leak alarm. Moreover, accurate line leak detection is difficult for liquid hydrocarbon fuels because these fuels are subject to large transient volume contractions and expansions due to thermal variations. Thermal contractions caused by cooling of a fuel after it has been pumped into the fuel line result in a decrease in the volume of liquid within the liquid line which can appear to be a line leak. Accordingly, a line leak detector must distinguish between thermal contractions and a true leak.

The art has heretofore provided line leak detectors for liquid delivery systems. However, these line leak detectors have not been easy to install, particularly in retrofit applications. For example, U.S. Pat. No. 4,876,530 to Hill et al. discloses the use of a pressure transducer mounted separate from the system controller and requiring dedicated wiring to communicate with the system controller. Therefore, in a retrofit application, additional wiring must be placed between the controller in the service station building and the sensor in the covered manway atop the underground storage tank requiring the disruption of the concrete or asphalt slab.

Known line leak detectors have also not been highly accurate. For example, U.S. Pat. No. 4,518,955 to Meyer discloses a device for measuring leaks in piping by using a spring loaded piston located in line with the flow of liquid. The cylinder of the piston has two detection points to measure the axial displacement of the piston. These detection points can be either mechanical reed relays or Hall effect sensors so that the device can indicate one of three states: shut-off, leak, or normal flow. Unfortunately, measurement of gross axial displacement using sensors or relays only provides a gross measurement of fluid flow and does not provide an accurate indication of leaks. U.S. Pat. No. 4,088,987 to Resler et al. discloses the use of a pressure transducer installed on the line near the dispenser which triggers an alarm in response to a drop in pressure below a predetermined threshold, thereby being susceptible to inaccuracy caused by thermal contraction. Similarly, U.S. Pat. No. 4,876,530 to Hill et al. discloses the use of a spring loaded piston to pressurize a pipe from a make-up reservoir. A pressure transducer, separate from the spring loaded piston, is used to detect the decay in pressure over time which is indicative of a leak. However, the pressure transducer may provide an inaccurate indication of a line leak because thermal changes may cause pressure to fail to accurately correlate with the liquid volume loss caused by a leak.

SUMMARY OF THE INVENTION

It is therefore an object of the present invention to provide an improved method and apparatus for detecting liquid line leakage in a liquid delivery system.

It is another object of the invention to provide an improved method and apparatus for detecting leaks in a liquid line which runs from a pumphead of a submersible pump to a liquid dispenser in a liquid delivery system.

It is yet another object of the present invention to provide a line leak detection method and apparatus which is easily installed in an existing liquid delivery system.

It is still another object of the present invention to provide a line leak detection method and apparatus which is highly accurate.

It is still a further object of the invention to provide a line leak detection method and apparatus which is not susceptible to false indications caused by thermally induced contractions of the liquid in the liquid line.

These and other objects are provided according to the present invention by an apparatus for detecting liquid leakage in a liquid delivery system, including a line leak detector which is adapted to be mechanically coupled to the liquid line at the pumphead of the submersible pump and to generate an electrical signal which is responsive to the liquid in the liquid line. Because the line leak detector is located in the covered manway on the liquid line immediately adjacent the pumphead, it monitors the entire exposed length of the liquid line to the liquid dispenser.

In a preferred embodiment, the line leak detector in the covered manway is electrically connected to the electrical power line which connects to the pumphead inside the covered manway. The submersible pump controller is adapted to receive the electrical signal from the line leak detector via the electrical power line which it uses to activate the submersible pump. Accordingly, the existing pumphead wiring is used to carry the detector's electrical signal so that new or additional wiring through the concrete slab need not be provided. The line leak detector may thereby be easily installed or retrofitted into a covered manway without disrupting the concrete or asphalt slab above the underground storage tank.

In one preferred embodiment, the submersible pump controller includes a separate processor and associated circuitry for leak detection interfaced with a separate liquid dispenser console. This embodiment is particularly suitable for a retrofit application. In another embodiment, the functions of leak detection and liquid dispensing may be combined into a single device to control the submersible pump.

According to the invention, a highly accurate line leak detector is also provided. The line leak detector includes a liquid reservoir which is adapted to be mechanically coupled to the liquid line. The liquid reservoir is preferably in the form of a cylinder. A piston is also included in the liquid reservoir with the piston being moveable in response to the volume of liquid in the reservoir. The piston includes a core mechanically coupled thereto for movement in response to the movement of the piston. A coil surrounds the core so that the core is moveable in the coil in response to the liquid in the reservoir to thereby change the electrical inductance of the coil. A spring is also connected to the piston to provide a restoring force to movement of the piston. Accordingly, the exact position of the piston in the reservoir may be monitored by measuring the inductance of the coil. Measurement of the coil inductance provides a highly accurate measurement of the volume of liquid in the reservoir so that an accurate measurement of a line leak may thereby be provided.

The pumphead wiring connection of the present invention may be used with any line leak detector to provide an easily installed line leak detection system. Moreover, the variable inductance line leak detector of the present invention may be used with any kind of electrical connection scheme to provide a highly accurate line leak detector. However, it will be understood by those having skill in the art that an easily installed and highly accurate line leak detection system may be obtained by using the pumphead wiring connection and the inductive line leak detector of the present invention in combination. When used in combination, the coil of the inductor is electrically connected to the pumphead wiring. A highly accurate and easily installed line leak detection system is thereby obtained.

When using the pumphead wiring and inductive line leak detector of the present invention in combination, one or more of a resistor, capacitor, and variable inductor network may be electrically connected to the coil to provide a tunable resonant circuit which has a high electrical impedance at the pump power frequency (typically 60 Hz), but has a low electrical impedance at the higher tuned circuit operating frequency. In contrast, the submersible pump may be designed to have a low impedance at low frequencies and a high impedance at higher frequencies. Accordingly, when the pump is being energized with 60 Hz alternating current, the electrical coil of the line leak detector is unaffected. Similarly, when the inductance of the electrical coil is measured for line leak detection, the pump does not interfere with these measurements.

According to the invention, line leaks may be detected by first energizing the submersible pump in response to a signal generated by the liquid dispenser to pump liquid. Alternatively, in the absence of a signal to dispense liquid, the pump may be energized to fill a reservoir connected to the liquid line in order to detect whether a line leak is present. Once the submersible pump is energized, the piston is moved back in the cylinder, against the force of the spring. The pump is then de-energized after liquid is dispensed or after the reservoir, formed by the piston and cylinder, has been filled. A high frequency electrical signal, for example 43 KHz, is then placed on the submersible pump power line by the pump controller, to thereby measure the inductance of the coil and core. For example, a high frequency signal of a predetermined voltage may be provided on the pump power line and the current in the power line may be measured to thereby determine the inductance of the coil as the pressure in the reservoir drops. The inductance signal as a function of time represents the position of the piston as a function of time. The position of the piston as a function of time may be equated to a leak rate.

A line leak may be detected by sampling the inductance signal at fixed time intervals and digitizing the sampled inductance signal. Since the pressure in the line will change in accordance with the varying force of the spring on the piston, the sampled signal may be corrected for this pressure variation by applying a correction factor which is a function of the known spring constant of the spring. Accordingly, a scaled leak rate may be obtained. The change in the scaled leak rate over time is then measured. If the scaled rate is zero, there is no leak. If the scaled rate decreases over time, then a thermal contraction is indicated. It is known that the rate of change of liquid volume due to thermal contraction will decrease as the liquid approaches equilibrium temperature with its surroundings. However, if the scaled leak rate remains constant above a predetermined threshold, then an actual leak has been detected. A shortened sequence of steps may be taken in monitoring the position of the piston to determine if a catastrophic leak may have occurred.

To avoid false indications caused by air in the line and to avoid the effects of thermal expansion, the leak detection sequence initially measures the time it takes the piston to move from a completely full position to a point past a precision bore in the cylinder wall sleeve. The bore in the cylinder wall sleeve provides a known leak rate. Air in the line or liquid expansion will keep the piston from moving, or delay the piston from moving, despite the leak through the bore. The piston can be refilled and the test repeated until the line reaches thermal equilibrium. Therefore, excess air is detected if the time for the piston to travel past the bore is longer than a predetermined threshold.

DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicant provides this embodiment so that this disclosure will be thorough and complete, and will fully convey the scope of the invention to those skilled in the art. Like numbers refer to like elements throughout.

Figure 1:
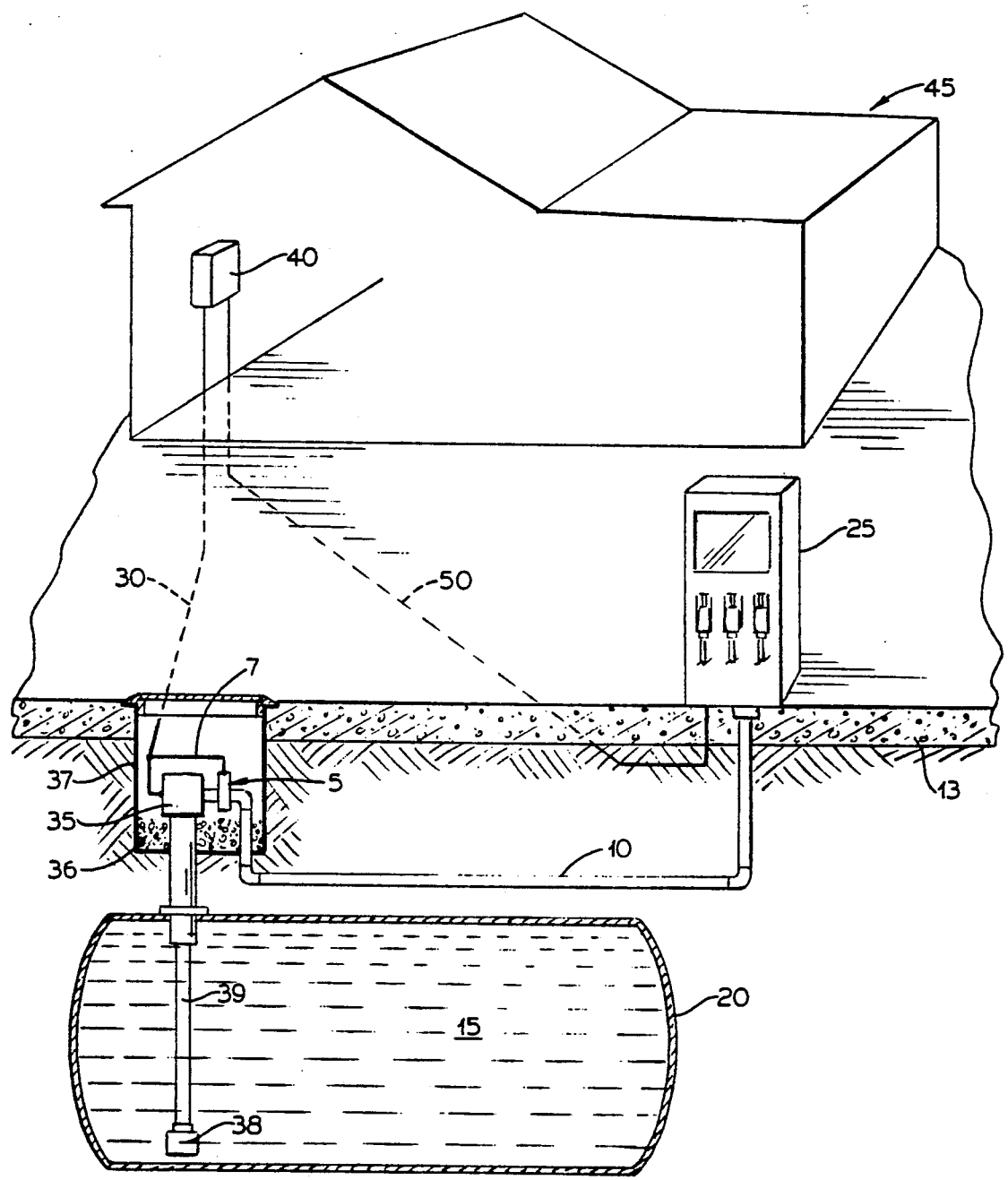
FIG. 1 is a diagrammatic view of a fuel service station with a line leak detector installed according to the present invention.

FIG. 1 illustrates the leak detection system of the present invention installed in a gasoline service station. The line leak detector 5 is mechanically and hydraulically connected to the fuel line 10 which supplies fuel 15 from the pumphead 35 in a covered manway 37, Which is placed atop an underground storage tank 20, to the fuel dispenser 25. The submersible pump typically consists of the pumphead 35 in the covered manway 37, a pump turbine 38 inside the underground storage tank 20 and a tube 39 connecting the pumphead 35 to the pump turbine 38. The covered manway 37 contains a gravel bottom 36 through which fuel lines 39, 10 and electrical connections 30 may be routed from beneath the concrete slab 13.

The electrical line 35 supplying power to the pumphead 35 from the pump controller 40, located in the service station building 45, is electrically connected in parallel by short wiring jumpers 7 to the line leak detector 5. The pump controller 40 may energize the submersible pump turbine 38 upon receipt of an electrical signal from the pump dispenser 25 via an electrical line 50, or the pump controller 40 may also energize the submersible pump turbine 38 for initiating a leak detection test sequence. As would be understood by one skilled in the art, the pump controller 40 for the leak detection system may be a separate device from a dispenser console, or it may be combined with a dispenser console in a single unit.

The concrete or asphalt slab 13 provides a surface upon which vehicles may travel and also protects the fuel line 10, electrical lines 50, 30, and the storage tank 20. Since retrofitting the line leak detector system to an existing service station uses the existing power wiring 30 from the station building 45 to the pumphead 35, expensive and disruptive digging into the concrete slab 13 to place additional electrical lines is avoided.

It would be understood by one skilled in the art to use various types of leak detectors 5 in the covered manway 37 atop the storage tank 20. For example, a pressure transducer provided with a power line carrier transmitter may be used to generate a leak detection signal and communicate it via existing pump wiring 30 to a remote alarm point, such as the pump controller 40. For power line carrier, the leak detection signal is modulated by a radio frequency modulator of a certain frequency, propagated over the electrical line 30, and demodulated at the pump controller 40. Locating the leak detector 5 in the covered manway 37 provides a number of advantages including: easy access for installation and maintenance of the leak detector, ready connection to the submersible pump wiring 30, and connection to the liquid line 10 at the point closest to the pumphead 35 thereby providing the position for most accurate leak detection of the entire liquid line 10.

Figure 2:
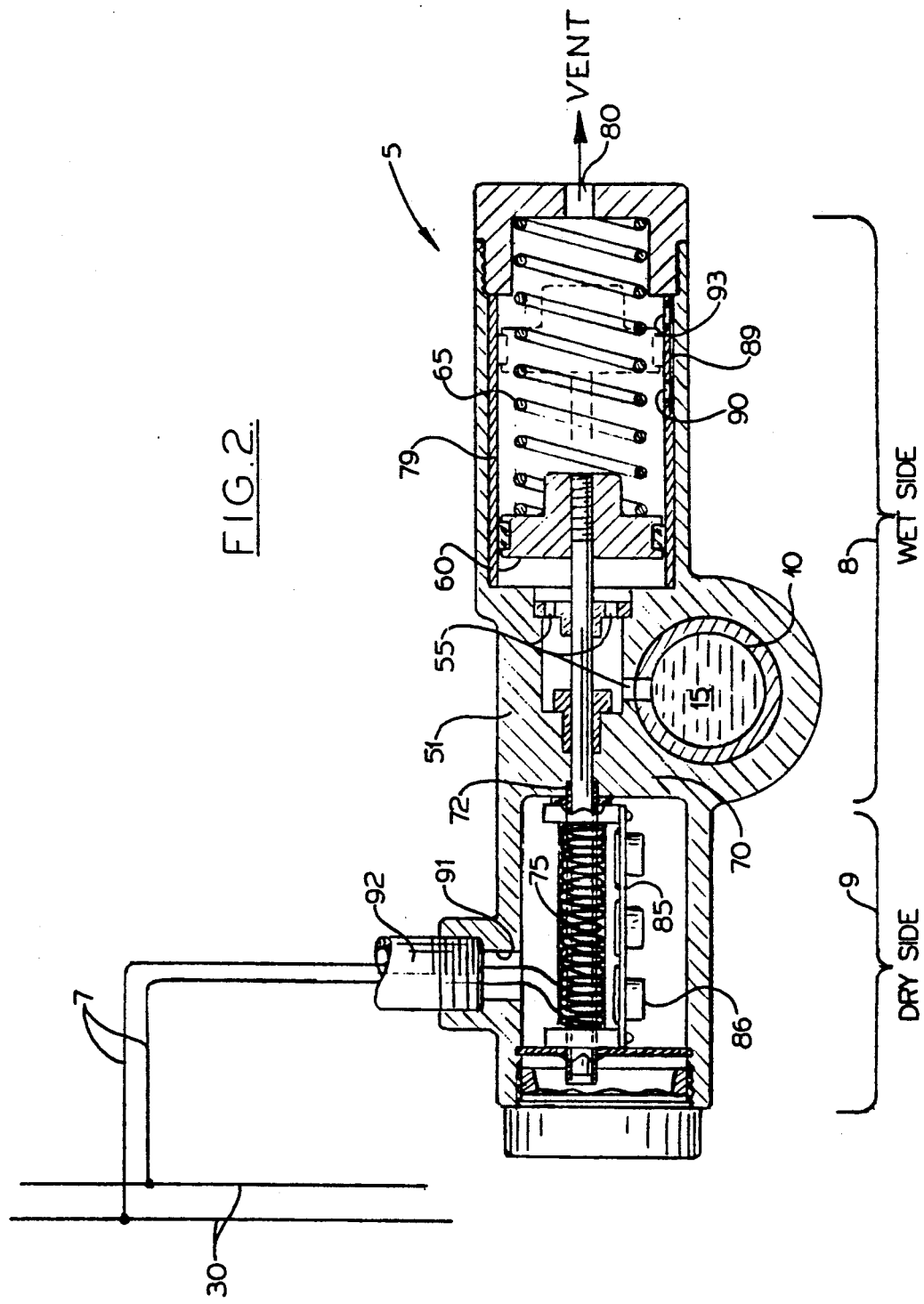
FIG. 2 is a top sectional view of a line leak detector according to the present invention.

FIG. 2 provides a top sectional view of the line leak detector 5 of the present invention. The line leak detector housing 51 is fitted to the liquid line 10 such that liquid 15 may flow from the line 10 through passageways 55 and against the face of the piston 60. The piston 60 and the housing 51 form a reservoir of liquid coupled to the liquid line 10. A high quality check valve, not shown, is disposed in the leak detector housing 51 to prevent the backflow of liquid out of the leak detector 5 and back into the pumphead 35 (FIG. 1). As the volume in the reservoir formed by the piston is increased, the piston 60 will compress the spring 65 and draw the core 70 attached to the piston 60 through the conductive coil 75 disposed on the "dry" side 9 of the detector housing 51. In a typical application, the core 70 is a rod made of ferromagnetic material. To meet "explosion proof" regulations for electrical fixtures, a tube 72, preferably of stainless steel, surrounds the core 70 in the "dry" side 9 of the leak detector housing 51.

Liquid in the "wet" side 8 of the detector housing 51 behind the piston 60 is allowed to vent back to the low pressure side of the pumphead 35 (FIG. 1) through a vent opening 80 in the cylinder housing 51 behind the piston 60. A precision bore 90 is machined into the inner sleeve 79 of leak detector housing 51 to provide a known leak rate during a portion of the piston 60 travel so that the presence of excess air in the line 10 (FIG. 1) may be detected. The piston 60 is pushed back behind the precision bore 90 when the pump turbine 38 (FIG. 1) is activated. After the pump 38 stops, liquid in front of the piston 60 flows through the bore 90 into a channel 89 formed by machining a flat area into a section of the inner sleeve 79. The liquid in the channel 89 may then vent through an opening 93 to an area behind the piston 60. The time it takes the piston 60 to move from a fully retracted position to a point past the precision bore 90 may be compared to a predetermined threshold to detect the presence of air in the liquid line 10 (FIG. 1).

Referring to FIGS. 1 and 2, the liquid volume in the line 10 may decrease due to a leak or due to contraction caused by a decrease in the temperature of the liquid after it has entered the line 10. In a typical scenario, warm fuel is pumped from a tanker truck into the storage tank 20. Before the fuel 15 in the storage tank 20 has a chance to reach thermal equilibrium with the surrounding earth, the dispenser 25 is activated which causes the warm fuel 15 to fill the relatively cool fuel line 10. The spring 65 and piston 60, installed in the "wet" side 8 of the housing 51, provide a mechanism for measuring the volume of fuel 15 being replaced into the fuel line 10 during thermal contraction. Electronic circuits and software in the pump controller 40 monitor the movement of the piston 60 to determine if a leak is present.

In FIG. 2, as the core 70 moves through the cylindrical conductive coil 75 on the "dry" side 9 of the housing 51, the electrical inductance of the coil 75 is altered. This change in electrical inductance of the coil 75 can be determined at a remote location by incorporating the conductive windings of the coil 75 in an electrical circuit, such as a series tuned resonant circuit. Various electrical tuning components 86, for example resistors, capacitors, and variable inductors can be installed on the circuit board 85 contained in the "dry" side 9 of the detector housing 51 for further enhancing the detection of the change in inductance of the coil 75. The tuned circuit components 86 may be chosen such that the coil 75 and the components 86 represent a large electrical impedance at the power frequency of 60 Hz, while having a lower impedance than the windings of the submersible pump 35 (FIG. 1) at the tuned circuit operating frequency. For a typical application, this operating frequency may be 43 KHz.

The electrical lines 7 of the coil 75 and other components 86 are brought out of the detector housing 51 through an opening 91, routed through a conduit 92, and electrically connected in parallel to the wiring 30 of the pumphead 35 (FIG. 1). It would be known to one skilled in the art to alter the physical placement of the core 70 and coil 75 in relation to the piston 60, as long as motion of the piston 60 would directly or indirectly cause a change in the inductance of the coil 75. For example, it would be known to one skilled in the art to position the coil 60 and core 70 behind the piston 60 rather than facing the piston 60. It would also be known to one skilled in the art to use photoelectric sensors, Hall Effect sensors, magnetic sensors, electrostatic sensors, or other motion detecting sensors in place of the core 70 and coil 85 to monitor piston 60 movement in response to the changing volume of liquid in the reservoir.

Figure 3:
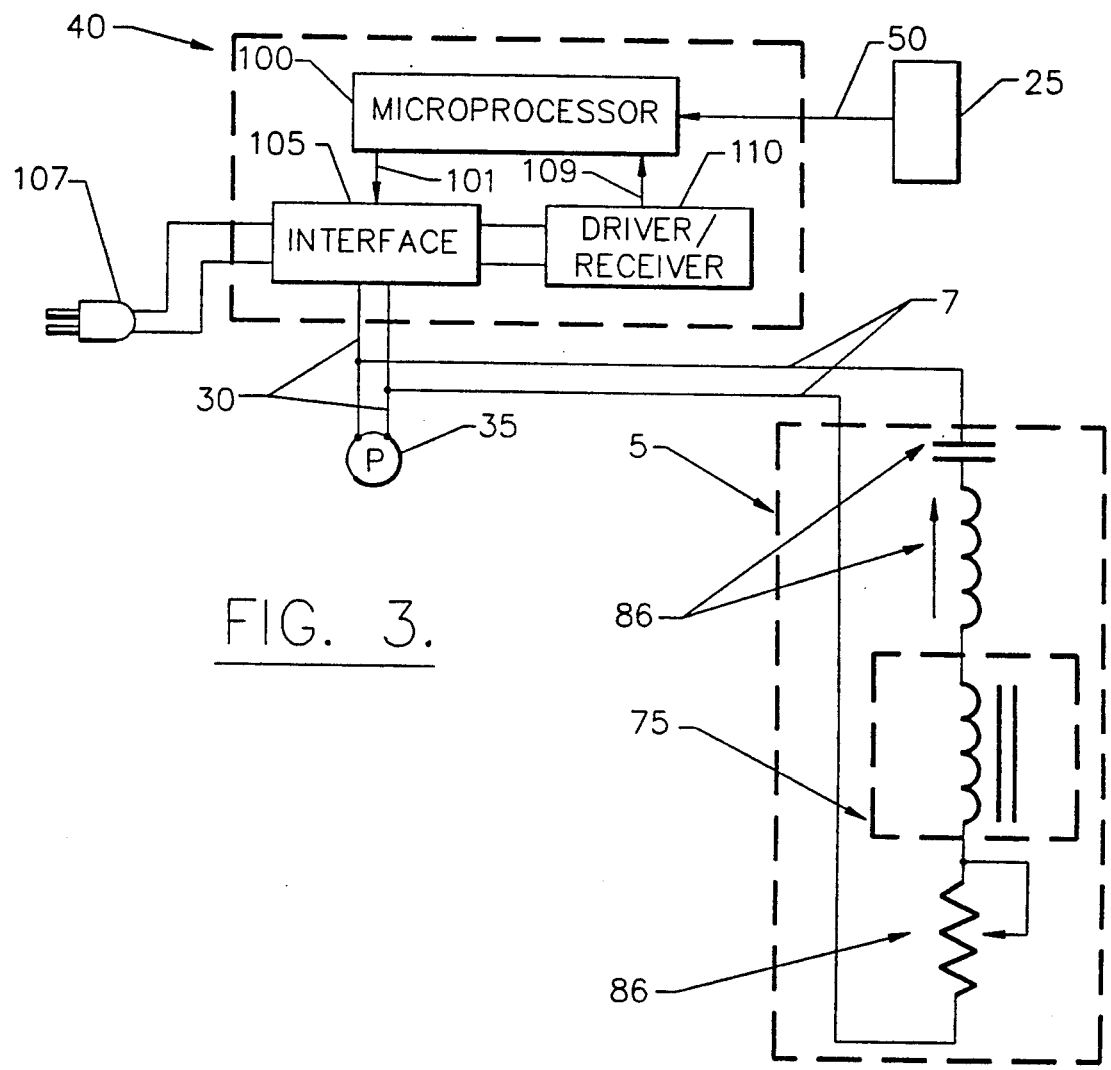
FIG. 3 is an electrical block diagram and partial schematic diagram of a line leak detector and submersible pump controller according to the present invention.

FIG. 3 is a simplified electrical block diagram of the line leak detector system of the present invention. The line leak detector 5 is electrically connected by electrical jumpers 7 to the power wiring 30 at the pumphead 35. The pump controller 40 includes an external 120 VAC power line connection 107. The power may be switched to the pumphead 35 at the line leak detector interface 105 to activate the pump turbine 38 (FIG. 1) to either fill the reservoir for line leak detection, or to provide liquid to the dispenser 25 upon receipt of a signal via the dispenser wiring 50. In the illustrated embodiment, the fuel dispensing control functions are incorporated with the leak detector functions into a single submersible pump controller 40 unit. It would be understood by those having skill in the art that the fuel dispenser control may reside in a separate console, especially in retrofit applications. It would also be understood by those having skill in the art that a submersible pump controller having only the leak detection functions may be interfaced with an existing fuel dispensing system. For example, the interface to an existing fuel dispensing system may be made by appropriate connections at the power contactor relay for the submersible pump.

The pump controller 40 includes a microprocessor 100 to control the leak detection and dispensing operations. It would be known to one skilled in the art that external vapor or liquid sensors, not shown, common in service station applications, may be readily adapted to operate under control of the microprocessor 100. These remote sensors may be placed in observation wells surrounding an underground storage tank or in the interstitial space between double-walled storage tanks. The microprocessor 100 may then give alarm indications and record the history of these sensors in addition to the alarm indications and history of the line leak detector 5.

The leak detector includes tuning components 86 in series with the inductive coil 75 which changes in inductance with movement of the piston 60 (FIG. 2) and core 70 (FIG. 2). The leak detector 5 is electrically connected in parallel by the wiring jumpers 7 to the submersible pump power wiring 30 which run through the station to the leak detector interface 105 of the pump controller 40. The leak detector interface 105 is controlled by a signal line 101 from the microprocessor 100. As would be known to one skilled in the art, the leak detector interface 105 may contain a relay to switch the leak detector 5 to the driver/receiver 110 when used in conjunction with the inductive leak detector 5, or a tunable filter may be incorporated into the interface 105 to prevent the flow of 60 Hz electrical current from the power supply connection 107 into the driver/receiver 110 if a power line carrier signal were used.

The leak detector interface 105 may connect the pump power wiring 30 to either the power supply 107 to energize the submersible pump turbine 38 (FIG. 2), or the interface may connect the wiring 30 to the detector driver/receiver 110 which contains an oscillator, filter, buffer, analog to digital converter, and amplifiers, as necessary, to convert the change in inductance to a digitized position of the piston 60 (FIG. 2). This digitized position signal is provided to the microprocessor 100 by a signal line 109. It would also be known to one skilled in the art to adapt the pump controller 40, by using conventional multiplexing techniques for example, to operate with multiple line leak detectors 5 as would be required in a typical gasoline service station application.

Figure 4:
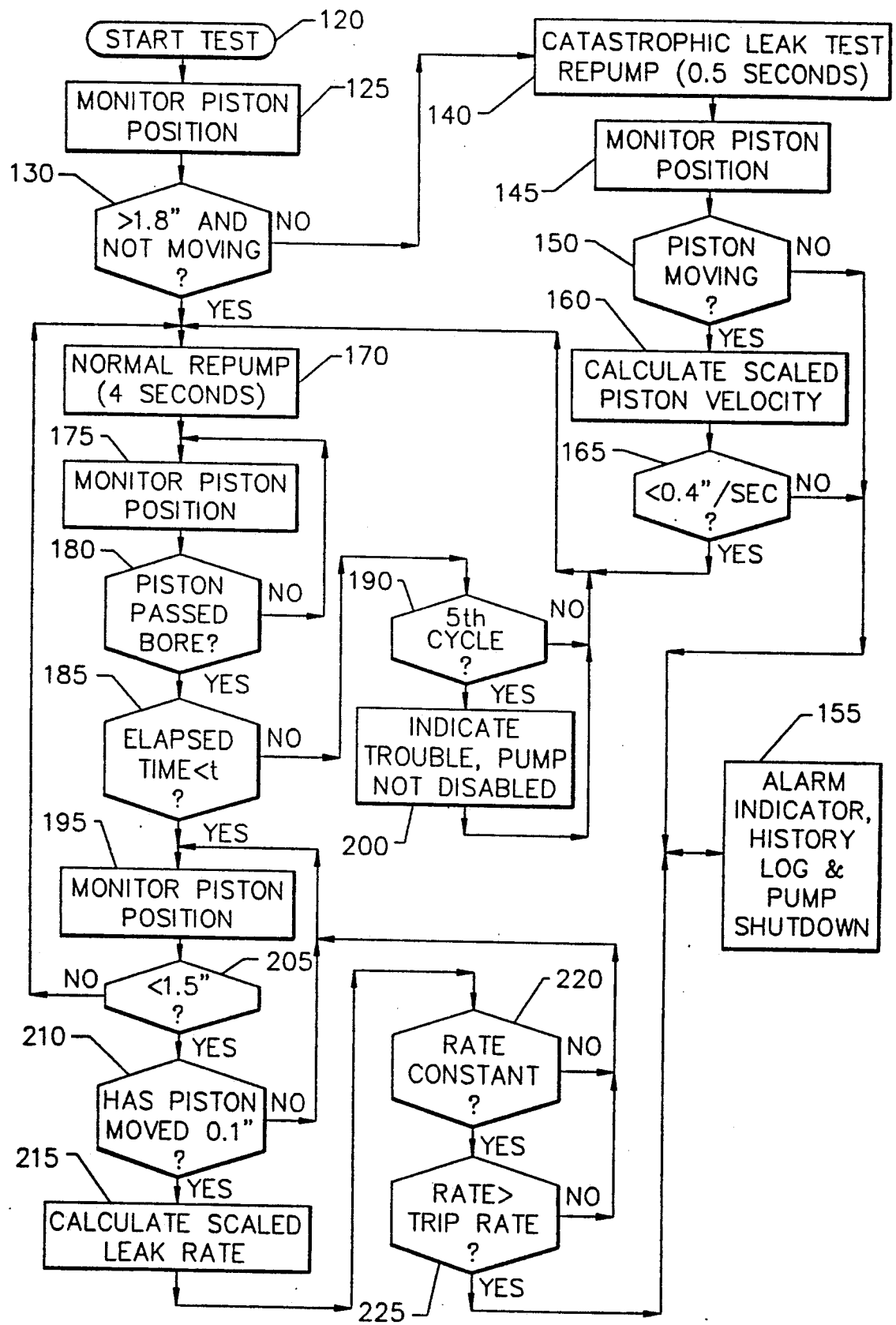
FIG. 4 is a flowchart diagram of the operations performed to detect a leak according to the present invention.

FIG. 4 is a flowchart illustrating the operations performed to detect a leak according to the present invention. It will be understood by those having skill in the art that the operations may be performed by the microprocessor 100 (FIG. 3), performing under stored program control. The leak detector 5 (FIG. 2) for this flowchart is a cylindrical housing 51 (FIG. 2) containing a piston 60 (FIG. 2) with a maximum position of 2 inches when the cylinder is fully empty, and having a position of 0 inches when the cylinder is completely full. If the pump dispenser calls on the submersible pump to run and dispense liquid at any time during the leak test, the testing sequence is aborted and begins anew at the start Block 120 after the pump is shutdown.

After the test sequence is initiated (Block 120), the position of the piston is monitored at Block 125. It will be understood by those having skill in the art that the microprocessor may actually monitor the inductance of the coil 75 (FIG. 2), or a related electrical parameter (such as current or voltage) and convert the inductance or other related electrical parameter to a position based upon the known correlation between the position and the electrical parameter for a particular line leak detector design.

If the position of the piston is determined to be greater than 1.8 inches at Block 130, corresponding to a nearly empty reservoir, the catastrophic leak test is initiated by activating the submersible pump for about 0.5 seconds at Block 140. The piston position is again monitored at Block 145 and if the piston has failed to move at Block 150, an alarm indication, history log, and pump shutdown are performed at Block 155. If the piston is determined to have moved at Block 150 in response to the 0.5 second repump at Block 140, a scaled piston velocity is determined (Block 160) and compared to a reference value of 0.4 inches per second at Block 165. The actual piston velocity may be determined by collecting and storing samples of the piston position as a function of time.

Since the force of the spring 75 (FIG. 2) varies with piston position, a conversion is made to equate the actual piston velocity to a scaled piston velocity that would result from a constant liquid line pressure. If the scaled piston velocity exceeds 0.4 inches per second, a catastrophic leak is indicated and an alarm indication and pump shutdown sequence is performed at Block 155. On the other hand, if the velocity is less than the 0.4 inches per second (Block 165), the system returns to the normal system repump at Block 170. It would be known to one skilled in the art to repeat the above catastrophic leak steps a number of times such that a catastrophic leak may be determined with a predetermined degree of statistical certainty. For example, such a degree of certainty for fuel service station applications may be a 95 percent confidence level that a catastrophic leak had occurred before an alarm indication and pump shutdown sequence is initiated (Block 155).

If the system has passed the catastrophic leak test from Block 165, or the piston initially had a position of less than 1.8 inches and was not moving as determined at Block 130, a normal repump (approximately 4 seconds) of the liquid line occurs at Block 170. The position of the piston is then monitored at Block 175. Because the piston has been pushed back past the machined precision bore 90 (FIG. 2) in the inner sleeve of the cylinder housing by the repump, the spring will then cause the piston to begin to move forward as the liquid in the cylinder drains through the precision bore. This movement of the piston is monitored at Block 175.

If the position indicates that the piston has passed the precision bore at Block 180, the elapsed time since the repump is compared to a predetermined threshold value at Block 185. If the elapsed time exceeds the predetermined threshold, the liquid may either be expanding due to thermal effects, or air may be trapped in the line. To determine if air is in the line, the repump and monitoring cycle may typically be repeated up to 5 times to allow the liquid in the line to reach thermal equilibrium. If the elapsed time threshold is exceeded on the fifth try (Block 190), the system will indicate a trouble to an operator, but will not disable the pump (Block 200).

If the line passes the test indicating that there is no air in the line and the liquid is not expanding, the piston position is monitored at Block 195 to begin the precision leak test. For a typical application, the position of the piston may be continuously sampled every 0.5 seconds to 1 minute. If the position of the piston is greater than 1.5 inches at Block 205, indicating that the piston is nearly empty, the sequence returns to the normal repump at Block 170. If the piston position is less than 1.5 inches (Block 125), then the change in piston position is examined to detect whether the piston has traveled 0.1 inches at Block 210.

As the piston moves in response to the spring force, the pressure in the line varies in proportion to the spring constant. A leak caused by a hole in the line, will pass liquid at a rate dependent on the pressure in the line. Therefore, for an accurate detection of a leak, the leak rate measured by the change in position of the piston may be scaled to a constant line pressure at Block 215. Values for the scaled leak rate (Block 215) may typically be calculated for every 0.1 inch of piston travel. As will be understood by those skilled in the art, in order to comply with changing environmental regulations, the scaled pressure may be readily changed by modifying software within the pump controller 40. For example, a scaled pressure of 10 pounds per square inch (psi) may be used, which conforms to current United States Environmental Protection Agency (EPA) regulations for continuous monitoring. Similarly, a scaled pressure of 45 psi may be used to comply with periodic testing required by the EPA.

If the scaled leak rate is determined to be constant (Block 220), the liquid has reached thermal equilibrium with its surroundings and the scaled rate can be compared to a threshold value at Block 225 to determine if a leak alarm and pump shutdown sequence (Block 155) should be initiated. If the scaled leak rate is not constant (Block 220), indicating that thermal equilibrium has not yet been reached, then the sequence returns to monitoring the piston position at Block 195. The leak rate threshold value may be set by the operator to a value of from 0.1 up to 3 gallons per hour (GPH) for a typical application. It would be known to one skilled in the art to repeat the precision leak detection sequence a number of times to increase the statistical certainty of a leak detection indication. For example, a 95 percent confidence level would be typical for a service station application. It would also be known by one skilled in the art that various resolutions of leak detection may be implemented and run at various times. For example, a detection routine to locate a leak of 3 GPH at a scaled pressure of 10 psi may be interposed with a leak detection routine to find a leak of 0.5 GPH at a scaled pressure of 45 psi. The particular sequence of different routines may be selected to comply with environmental monitoring regulations.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. An apparatus for detecting liquid leakage in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; the liquid leakage detecting apparatus comprising:
- a line leak detector, adapted to be mechanically coupled to the liquid line for generating an electrical signal responsive to liquid in the liquid line; and,
- means for electrically connecting said line leak detector to the electrical power line;
- the pump controller being adapted to include means for receiving said electrical signal via the electrical power line, and the pump controller including a relay, controlled by the pump controller, for electrically connecting the receiving means to the electrical power line when the pump is not activated.

2. The apparatus of claim 1 wherein the liquid delivery system further includes a manway atop the storage tank and wherein the pump comprises a pumphead in the manway, with the pumphead being electrically connected to the electrical power line and being mechanically connected to the liquid line; and wherein said line leak detector is electrically connected to the electrical line in the manway and mechanically coupled to said liquid line in the manway.

3. The apparatus of claim 1 wherein said line leak detector comprises a liquid line reservoir, and wherein said line leak detector generates said electrical signal responsive to a volume of liquid in said liquid line reservoir.

4. The apparatus of claim 1 wherein said line leak detector generates said electrical signal responsive to a pressure of liquid in said liquid line.

5. An apparatus for detecting liquid leakage in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; the liquid leakage detecting apparatus comprising:
- a line leak detector, adapted to be mechanically coupled to the liquid line for generating an electrical signal responsive to liquid in the liquid line; and,
- means for electrically connecting said line leak detector to the electrical power line;
- the pump controller being adapted to include means for receiving said electrical signal via the electrical power line, and the pump controller including a tuned filter for preventing electrical power applied by the pump controller from flowing to the receiving means.

6. The apparatus of claim 5 wherein said line leak detector includes a modulator to modulate said electrical signal and said receiving means includes a demodulator to demodulate said electrical signal.

7. The apparatus of claim 6 wherein said modulator is a radio frequency modulator of a first radio frequency and said demodulator is a radio frequency demodulator of the first radio frequency.

8. A liquid delivery system comprising:
- a liquid storage tank;
- a liquid dispenser;
- a pump for pumping liquid from said storage tank to said liquid dispenser;
- a pump controller for applying power to said pump to thereby activate said pump;
- an electrical power line, electrically connected between said pump controller and said pump, for delivering power applied by said pump controller to said pump;
- a line leak detector mechanically coupled to said liquid line for generating an electrical signal responsive to liquid in said liquid line; and
- means for electrically connecting said line leak detector to said electrical power line which is electrically connected between said pump controller and said pump;
- said pump controller comprising
  - means for receiving said electrical signal via said electrical power line which is electrically connected between said pump controller and said pump, and
  - interfacing means for operatively disconnecting said receiving means from the electrical power line when the pump controller is applying power to said pump to activate same.

9. The apparatus of claim 8 further comprising a manway atop said liquid storage tank; wherein said pump comprises a pumphead in said manway, said pumphead being electrically connected to said electrical power line and being mechanically connected to said liquid line; and wherein said line leak detector is electrically connected to said electrical power line in said manway and mechanically coupled to said liquid line in said manway.

10. The liquid delivery system of claim 8 wherein said line leak detector comprises:
- a liquid line reservoir, mechanically coupled to said liquid line extending between said pump and said liquid dispenser;
- a piston in said liquid line reservoir, and piston being moveable in response to liquid in said reservoir; and
- piston movement sensing means for continuously sensing the position of said piston and generating an electrical signal proportional thereto.

11. The liquid delivery system of claim 10 further comprising a spring, connected to said piston, for providing restoring force to movement of said piston.

12. The liquid delivery system of claim 10 wherein said piston movement sensing means comprises:
- a core coupled to said piston, for movement along a predetermined path upon movement of said piston in response to liquid in said reservoir; and
- an electrically conductive coil, mounted along said predetermined path, said core moving within said coil in response to liquid in said reservoir, to thereby change the electrical inductance of said coil;
- whereby change in the electrical inductance of said coil may be monitored to detect a leak in said liquid line.

13. The liquid delivery system of claim 12 further comprising means, electrically connected to said coil, for monitoring the inductance of said coil.

14. A liquid delivery system comprising:
- a liquid storage tank;
- a liquid dispenser;
- a pump for pumping liquid from said storage tank to said liquid dispenser;
- a liquid line between said pump and said liquid dispenser;
- a pump controller for applying power to said pump to thereby activate said pump;
- an electrical power line, electrically connected between said pump controller and said pump, for delivering power applied by said pump controller to said pump;

a liquid line reservoir, mechanically coupled to said liquid line extending between said pump and said liquid dispenser;

a piston in said liquid reservoir, said piston being moveable in response to liquid in said reservoir; and piston movement sensing means for continuously sensing the position of said piston and generating an electrical signal proportional thereto;

said pump controller comprising means for receiving said electrical signal via said electrical power line which is electrically connected between said pump controller and said pump, and interfacing means for operatively disconnecting said receiving means from the electrical power line when the pump controller is applying power to said pump to activate same;

whereby the change in the electrical signal may be monitored to detect a leak in the liquid line.

15. The apparatus of claim 14 further comprising a manway atop said liquid storage tank; wherein said pump comprises a pumphead in said manway, said pumphead being electrically connected to said electrical power line and being mechanically connected to said liquid line; wherein said piston movement sensing means is electrically connected to said electrical power line in said manway; and wherein said reservoir is mechanically coupled to said liquid line in said manway.

16. The liquid delivery system of claim 14 further comprising a spring, connected to said piston, for providing restoring force to movement of said piston.

17. The liquid delivery system of claim 14 wherein said piston movement sensing means comprises:

a core coupled to said piston, for movement along a predetermined path upon movement of said piston in response to liquid in said reservoir; and an electrically conductive coil, mounted along said predetermined path, said core moving within said coil in response to liquid in said reservoir, to thereby change the electrical inductance of said coil;

whereby change in the electrical inductance of said coil may be monitored to detect a leak in said liquid line.

18. The liquid delivery system of claim 17 further comprising means, electrically connected to said coil, for monitoring the inductance of said coil.

19. A method of installing a line leak detector in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; said method comprising the steps of:

coupling a line leak detector to the liquid line for generating an electrical signal responsive to liquid in the liquid line;

electrically connecting the line leak detector to the electrical power line between the pump and the pump controller for applying electrical power to the pump; and providing an interface for operatively disconnecting a receiver in the pump controller from the electrical power line, electrically connected between the pump and the pump controller, when the pump controller is applying power to the pump to activate same.

20. The method of claim 19 wherein the liquid delivery system further includes a manway atop the storage tank and wherein the pump comprises a pumphead in the manway, the pumphead being electrically connected to the electrical power line in the manway and mechanically connected to the liquid line in the manway; wherein the step of coupling the line leak detector to the liquid line comprises coupling the line leak detector to the liquid line in the manway; and wherein the step of electrically connecting the line leak detector to the electrical power line comprises electrically connecting the line leak detector to the electrical power line in the manway.

21. A method of detecting leakage of liquid from a liquid delivery system including a liquid storage tank, a pump for pumping liquid from the storage tank through the liquid line to a liquid dispenser, and an electrical power line, electrically connected between the pump and a pump controller, the pump controller applying power to the electrical power line to thereby activate the pump, said method comprising the steps of:

coupling a reservoir to the liquid line extending between the pump and the liquid dispenser, the reservoir containing a piston which changes position in response to a volume of liquid in the reservoir;

activating the pump to refill the reservoir when the position of the piston exceeds a preselected position;

repeatedly monitoring the position of the piston via the electrical power line at a preselected time interval, to thereby detect a leak; and operatively disconnecting a receiver in the pump controller from the electrical power line when the pump controller is applying power to the pump to activate same.

22. An apparatus for detecting liquid leakage in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; the liquid leakage detecting apparatus comprising:

a liquid line reservoir, adapted to be mechanically coupled to the liquid line;

a piston in said liquid line reservoir, said piston being moveable in response to liquid in said reservoir;

piston movement sensing means for continuously sensing the position of said piston and generating an electrical signal proportional thereto;

means for electrically connecting said piston movement sensing means to the electrical power line; and the pump controller being adapted to include means for receiving said electrical signal via the electrical power line, and the pump controller including a relay, controlled by the pump controller, for electrically connecting the receiving means to the electrical power line when the pump is not activated.

23. The apparatus of claim 22 wherein the liquid delivery system further includes a manway atop the storage tank and wherein the pump comprises a pumphead in the manway, with the pumphead being electrically connected to the electrical power lien and being mechanically connected to the liquid line; and wherein said piston movement sensing means is electrically connected to said electrical power line in the manway; and wherein said reservoir is mechanically coupled to said liquid line in the manway.

24. The apparatus of claim 22 further comprising a spring, connected to said piston, for providing restoring force to movement of said piston.

25. An apparatus for detecting liquid leakage in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; the liquid leakage detecting apparatus comprising:
- a liquid reservoir, adapted to be mechanically coupled to the liquid line;
- a piston in said liquid line reservoir, said piston being moveable in response to liquid in said reservoir;
- piston movement sensing means for continuously sensing the position of said piston and generating an electrical signal proportional thereto;
- means for electrically connecting said piston movement sensing means to the electrical power line; and
- the pump controller being adapted to include means for receiving said electrical signal via the electrical power line, and the pump controller including a tuned filter for preventing electrical power applied by the pump controller from flowing to the receiving means.

26. The apparatus of claim 25 wherein said line leak detector includes a modulator to modulate said electrical signal and said receiving means includes a demodulator to demodulate said electrical signal.

27. The apparatus of claim 26 wherein said modulator is a radio frequency modulator of a first radio frequency and said demodulator is a radio frequency demodulator of the first radio frequency.

28. An apparatus for detecting liquid leakage in a liquid delivery system including a liquid storage tank; a pump for pumping liquid from the storage tank through a liquid line to a liquid dispenser; and an electrical power line, electrically connected between the pump and a pump controller, the pump controller applying power to the electrical power line to thereby activate the pump; the liquid leakage detecting apparatus comprising:
- a liquid reservoir, adapted to be mechanically coupled to the liquid line;
- a piston in said liquid line reservoir, said piston being moveable in response to liquid in said reservoir;
- piston movement sensing means for continuously sensing the position of said piston and generating an electrical signal proportional thereto, said piston movement sensing means comprising:
  - a core coupled to said piston, for movement along a predetermined path upon movement of said piston in response to liquid in said reservoir
  - an electrically conductive coil, mounted along said predetermined path, said core moving within said coil in response to liquid in said reservoir, to thereby change the electrical inductance of said coil; and
  - means, electrically connected to said coil, for monitoring the inductance of said coil and comprising means for sampling said inductance of said coil, means for digitizing said sampled inductance of said coil, means for calculating the velocity of said piston from said digitized sampled inductance of said coil, and means for detecting a leak in the liquid line from said calculated velocity;
- means for electrically connecting said piston movement sensing means to the electrical power line; and
- the pump controller being adapted to include means for receiving said electrical signal via the electrical power line.

29. The apparatus of claim 28 wherein said detecting means comprises:
- means for scaling said calculated velocity relative to a predetermined pressure;
- means for converting said scaled calculated velocity to a leak rate; and
- means for comparing said leak rate to a predetermined threshold, to thereby detect a leak.

30. A liquid delivery system comprising:
- a liquid storage tank;
- a liquid dispenser;
- a pump for pumping liquid from said storage tank to said liquid dispenser;
- a liquid line between said pump and said liquid dispenser;
- a pump controller for applying power to said pump to thereby activate said pump;
- an electrical power line, electrically connected between said pump controller and said pump, for delivering power applied by said pump controller to said pump;
- a line leak detector mechanically coupled to said liquid line for generating an electrical signal responsive to liquid in said liquid line, said line leak detector comprising:
  - a liquid reservoir, mechanically coupled to said liquid line;
  - a piston in said liquid line reservoir, and piston being moveable in response to liquid in said reservoir; and
  - piston movement sensing means for continuously sensing the position of said piston and generating an electrical signal proportional thereto, said piston movement sensing means comprising:
    - a core coupled to said piston, for movement along a predetermined path upon movement of said piston in response to liquid in said reservoir;
    - an electrically conductive coil, mounted along said predetermined path, said core moving within said coil in response to liquid in said reservoir, to thereby change the electrical inductance of said coil; and
    - means, electrically connected to said coil, for monitoring the inductance of said coil and comprising means for sampling said inductance of said coil, means for digitizing said sampled inductance of said coil, means for calculating the velocity of said piston from said digitized sampled inductance of said coil, and means for detecting a leak in said liquid line from said calculated velocity; and
- means for electrically connecting said line leak detector to said electrical power line;
- said pump controller comprising means for receiving said electrical signal via said electrical power line.

31. The liquid delivery system of claim 30 wherein said detecting means comprises:
means for scaling said calculated velocity relative to a predetermined pressure;
means for converting said scaled calculated velocity to a leak rate; and
means for comparing said leak rate to a predetermined threshold, to thereby detect a leak.

32. A liquid delivery system comprising:
a liquid storage tank;
a liquid dispenser;
a pump for pumping liquid from said storage tank to said liquid dispenser;
a liquid line between said pump and said liquid dispenser;
a pump controller for applying power to said pump to thereby activate said pump;
an electrical power line, electrically connected between said pump controller and said pump, for delivering power applied by said pump controller to said pump;
a liquid line reservoir, mechanically coupled to said liquid line;
a piston in said liquid line reservoir, said piston being moveable in response to liquid in said reservoir; and
piston movement sensing means for continuously sensing the position of said piston and generating an electrical signal proportional thereto, said piston movement sensing means comprising:
a core coupled to said piston, for movement along a predetermined path upon movement of said piston in response to liquid in said reservoir;
an electrically conductive coil, mounted along said predetermined path, said core moving within said coil in response to liquid in said reservoir, to thereby change the electrical inductance of said coil; and
means, electrically connected to said coil, for monitoring the inductance of said coil and comprising means for sampling said inductance of said coil, means for digitizing said sampled inductance of said coil, means for calculating the velocity of said piston from said digitized sampled inductance of said coil, and means for detecting a leak in said liquid line from said calculated velocity.

33. The liquid delivery system of claim 32 wherein said detecting means comprises:
means for scaling said calculated velocity relative to a predetermined pressure;
means for converting said scaled calculated velocity to a leak rate, and
means for comparing said leak rate to a predetermined threshold, to thereby detect a leak.

34. A method of detecting leakage of liquid from a liquid delivery system including a liquid storage tank, and a pump for pumping liquid from the storage tank through the liquid line to a liquid dispenser, said method comprising the steps of:
coupling a reservoir to the liquid line, the reservoir containing a piston which changes position in response to a volume of liquid in the reservoir;
activating the pump to refill the reservoir when the position of the piston exceeds a preselected position; and
repeatedly monitoring the position of the piston at a preselected time interval by:
sampling the position of the piston at preselected time intervals;
calculating a piston velocity from the samples of the piston position;
scaling the piston velocity relative to a predetermined pressure;
converting the scaled piston velocity to a leak rate; and
comparing the leak rate to a predetermined threshold, to thereby detect a leak.

35. A line leak detector for a liquid delivery system including a liquid storage tank and a pump for pumping liquid through a liquid line to a liquid dispenser, said line leak detector comprising:
a liquid line reservoir, adapted to be mechanically coupled to the liquid line extending between the pump and the liquid dispenser;
a piston in said liquid line reservoir, said piston being moveable in response to liquid in said reservoir;
piston movement sensing means for continuously sensing the position of said piston and generating an electrical signal proportional thereto, said piston movement sensing means comprising
a core coupled to said piston, for movement along a predetermined path upon movement of said piston in response to liquid in said reservoir; and
an electrically conductive coil, mounted along said predetermined path, said core moving within said coil in response to liquid in said reservoir, to thereby change the electrical inductance of said coil;
means, electrically connected to said coil, for monitoring the inductance of said coil, said monitoring means comprising
means for sampling said inductance of said coil;
means for digitizing said sampled inductance of said coil;
means for calculating the velocity of said piston from said digitized sampled inductance of said coil; and
means for detecting a leak in the liquid line from said calculated velocity.

36. The line leak detector of claim 35 further comprising a spring, connected to said piston, for providing restoring force to movement of said piston.

37. The line leak detector of claim 35 wherein said detecting means comprises:
means for scaling said calculated velocity relative to a predetermined pressure;
means for converting said scaled calculated velocity to a leak rate; and
means for comparing said leak rate to a predetermined threshold, to thereby detect a leak.

* * * * *

UNITED STATES PATENT AND TRADEMARK OFFICE
CERTIFICATE OF CORRECTION

PATENT NO. : 5,091,716

DATED : February 25, 1992

INVENTOR(S) : Thomas E. Nelson, Walter S. Brock

It is certified that error appears in the above-identified patent and that said Letters Patent is hereby corrected as shown below:

Col. 5, line 49:   after "20" insert --,--.

Col. 5, line 55:   delete "35" and insert --30--.

Col. 11, line 65:  after "dispenser" insert --a liquid line between said pump and said liquid dispenser--.

Col. 13, line 6:   after "liquid" insert --line--.

Col. 14, line 68:  delete "lien" and insert --line--.

Col. 15, line 51:  after "liquid" insert --line--.

Signed and Sealed this

Sixth Day of July, 1993

Attest:

MICHAEL K. KIRK

Attesting Officer    Acting Commissioner of Patents and Trademarks